United States Patent
Tokura et al.

(10) Patent No.: US 9,628,173 B2
(45) Date of Patent: Apr. 18, 2017

(54) OPTICAL TRANSMISSION LINE SWITCHING APPARATUS AND OPTICAL TRANSMISSION SYSTEM

(71) Applicant: Mitsubishi Electric Corporation, Chiyoda-ku (JP)

(72) Inventors: Toshiyuki Tokura, Chiyoda-ku (JP); Shun Chikamori, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/897,115

(22) PCT Filed: Oct. 4, 2013

(86) PCT No.: PCT/JP2013/077116
§ 371 (c)(1),
(2) Date: Dec. 9, 2015

(87) PCT Pub. No.: WO2015/049794
PCT Pub. Date: Apr. 9, 2015

(65) Prior Publication Data
US 2016/0134360 A1    May 12, 2016

(51) Int. Cl.
*H04B 10/00*    (2013.01)
*H04B 10/032*   (2013.01)
(Continued)

(52) U.S. Cl.
CPC ........ *H04B 10/032* (2013.01); *H04J 14/0221* (2013.01); *H04J 14/0227* (2013.01);
(Continued)

(58) Field of Classification Search
CPC ......................................... H04B 10/29–10/299
(Continued)

(56) References Cited

U.S. PATENT DOCUMENTS 6,434,286 B2 *  8/2002  Hayashi ............. H04Q 11/0005
                                                    385/15
6,687,049 B1 *  2/2004  Sulhoff ............... H01S 3/06754
                                                    359/341.32
(Continued)

FOREIGN PATENT DOCUMENTS

JP    10-303814 A    11/1998
JP    2001-339344 A  12/2001
(Continued)

OTHER PUBLICATIONS

International Search Report Issued Nov. 19, 2013, for PCT/JP13/77116 Filed Oct. 4, 2013.
(Continued)

*Primary Examiner* — Agustin Bello
(74) *Attorney, Agent, or Firm* — Oblon, McClelland, Maier & Neustadt, L.L.P.

(57) ABSTRACT

A device includes a threshold setting unit that sets a threshold for an input optical power monitor to detect the input optical power to the optical transmission line of an active system; a threshold deciding unit that decides whether the input optical power to the optical transmission line of the active system detected by the input optical power monitor is not greater than the threshold set by the threshold setting unit or not; and an attenuation controller that carries out, when the threshold deciding unit decides that the input optical power is not greater than the threshold, system switching by controlling first variable optical attenuators so as to gradually reduce attenuation of the signal light rays input from the optical transmission line of one backup system, and to gradually increase attenuation of the signal light rays input from the optical transmission line of the active system.

13 Claims, 10 Drawing Sheets

(51) Int. Cl.
*H04J 14/02* (2006.01)
*H04Q 11/00* (2006.01)

(52) U.S. Cl.
CPC . *H04Q 11/0005* (2013.01); *H04Q 2011/0016* (2013.01); *H04Q 2011/0043* (2013.01)

(58) Field of Classification Search
USPC .................................. 398/173–181, 18, 37
See application file for complete search history.

(56) References Cited

U.S. PATENT DOCUMENTS

| | | | | |
|---|---|---|---|---|
| 6,768,831 | B2* | 7/2004 | Maeda | H04J 14/0212 385/16 |
| 6,987,922 | B2* | 1/2006 | Bierman | H04B 10/077 333/81 R |
| 7,123,404 | B1* | 10/2006 | Mori | H04B 10/0771 359/337.11 |
| 7,209,661 | B2* | 4/2007 | Mori | H04B 10/506 398/43 |
| 7,813,642 | B2* | 10/2010 | Muro | H04J 14/0204 398/83 |
| 8,175,458 | B2* | 5/2012 | Way | H04J 14/0204 398/68 |
| 8,396,366 | B2* | 3/2013 | Ferrari | H04B 10/032 398/27 |
| 8,554,070 | B2* | 10/2013 | Ueki | H04B 10/506 398/182 |
| 8,565,604 | B2* | 10/2013 | Koyano | H04B 10/07955 398/34 |
| 8,879,903 | B2* | 11/2014 | Ferrari | H04B 10/032 398/15 |
| 2001/0046344 | A1 | 11/2001 | Hayashi et al. | |
| 2003/0025965 | A1* | 2/2003 | Takatsu | G06F 12/0866 398/79 |
| 2003/0099475 | A1* | 5/2003 | Nemoto | H04J 14/0212 398/83 |
| 2003/0223728 | A1* | 12/2003 | Maeda | H04B 10/2931 385/140 |
| 2004/0071392 | A1* | 4/2004 | Lauder | H04B 10/077 385/17 |
| 2004/0161234 | A1* | 8/2004 | Ozawa | H04B 10/077 398/33 |
| 2005/0123305 | A1 | 6/2005 | Kawasumi | |
| 2006/0210272 | A1* | 9/2006 | Shimizu | H01S 3/06758 398/79 |
| 2006/0221435 | A1* | 10/2006 | Maeda | H04B 10/296 359/337 |
| 2006/0275035 | A1* | 12/2006 | Way | H04B 10/27 398/59 |
| 2007/0138417 | A1* | 6/2007 | Sugiyama | H04B 10/032 250/551 |
| 2008/0095537 | A1* | 4/2008 | Sakamoto | H04B 10/0775 398/83 |
| 2008/0170286 | A1* | 7/2008 | Goto | H04B 10/0775 359/230 |
| 2009/0297143 | A1* | 12/2009 | Takeyama | H04B 10/07955 398/34 |
| 2010/0028008 | A1* | 2/2010 | Nakajima | H04B 10/07955 398/83 |
| 2010/0119223 | A1* | 5/2010 | Ferrari | H04B 10/032 398/4 |
| 2011/0019995 | A1 | 1/2011 | Suzuki et al. | |
| 2011/0236016 | A1 | 9/2011 | Nagamine | |
| 2012/0230681 | A1* | 9/2012 | Ueki | H04B 10/506 398/34 |
| 2012/0248287 | A1 | 10/2012 | Shukunami | |
| 2013/0129342 | A1* | 5/2013 | Ferrari | H04B 10/032 398/5 |
| 2013/0251367 | A1* | 9/2013 | Ishii | H04B 10/0775 398/48 |

FOREIGN PATENT DOCUMENTS

| | | |
|---|---|---|
| JP | 2004-361818 | 12/2004 |
| JP | 2011-029891 A | 2/2011 |
| JP | 2011-199789 A | 10/2011 |
| JP | 2012-221970 A | 11/2012 |
| WO | 2004/045114 A1 | 5/2004 |

OTHER PUBLICATIONS

Office Action mailed Jan. 31, 2017 in Japanese Patent Application No. 2015-540348 (with Machine English Translation).

* cited by examiner (a)

(b)

OPTICAL TRANSMISSION LINE SWITCHING APPARATUS AND OPTICAL TRANSMISSION SYSTEM

TECHNICAL FIELD

The present invention relates to an optical transmission line switching apparatus that switches between a plurality of optical transmission lines of an active system and a backup system and outputs its signal light rays to a downstream optical repeater, and to an optical transmission system with the optical transmission line switching apparatus.

BACKGROUND ART

With an increasing capacity of a wavelength multiplexing optical transmission system, the influence of a communication shutoff due to a failure of an optical transmission line is growing. Thus, to improve the reliability of an optical transmission system, backup redundancy of an optical transmission line and switching to a backup system at the time of a failure of the active system is effective.

On the other hand, as for a long distance optical transmission system with optical repeaters, there is a danger that transitional power changes of signal light rays at the switching between the optical transmission lines can bring about an optical surge in an optical amplifier of a downstream optical repeater, thereby damaging its downstream optical receiver because of excessive power. As a conventional optical transmission line switching apparatus, Patent Document 1, for example, discloses an optical receiver that switches the received light rays to a backup route between the two routes of an active system and a backup system if the power of the received light rays from the active route reduces. In addition, Patent Document 2 discloses a method of avoiding an optical surge occurring in an optical amplifier at the time of switching between the optical transmission lines.

PRIOR ART DOCUMENT

Patent Document

Patent Document 1: WO2004/045114.
Patent Document 2: Japanese Patent Laid-Open No. 2012-221970.

DISCLOSURE OF THE INVENTION

Problems to be Solved by the Invention

However, in the technique disclosed in the Patent Document 1, for example, since the downstream optical transmission power reduces temporarily before switching between the two optical transmission lines, and then the optical power is suddenly recovered by the switching, a problem arises in that the downstream optical power transmitted changes and there is a danger of causing an optical surge. In addition, depending on the switching timing, the optical power losses of the two optical transmission lines can take the minimum value at the same time, which brings about a problem of causing an instantaneous interruption of the light rays.

In addition, in an optical add/drop multiplexing (OADM) system that inserts signal light rays with different wavelengths downstream, the power changes in the upstream signal light rays can induce changes in the power and in the optical OSNR (Optical Signal-to-Noise Ratio) of the signal light rays inserted downstream, and this presents a problem of being likely to have an influence on the transmission characteristics.

In contrast, as for the technique disclosed in the Patent Document 2, although it discloses a method of suppressing the optical surge occurring in the optical amplifier at the switching between the optical transmission lines, it requires a special optical amplifier, which presents a problem of being unable to be applied to an optical transmission system with a plurality of ordinary optical amplifiers disposed downstream.

The present invention is implemented to solve the foregoing problems. Therefore it is an object of the present invention to provide an optical transmission line switching apparatus and an optical transmission system with it capable of positively suppressing the power changes at the time of switching between a plurality of optical transmission lines of the active system and the backup system.

Means for Solving the Problem

To accomplish the object, an optical transmission line switching apparatus in accordance with the present invention is an optical transmission line switching apparatus to carry out system switching between an optical transmission line of a single active system and an optical transmission line of at least one backup system, and that comprises: input optical power monitors that are provided to the optical transmission lines, respectively, to monitor input optical powers of signal light rays input from the optical transmission lines; first variable optical attenuators that are placed downstream of the input optical power monitors, respectively, to attenuate and output the signal light rays input from the optical transmission lines; a multiplexer to multiplex the signal light rays output from the first variable optical attenuators; a threshold setter to set a threshold for the input optical power monitor to detect the input optical power to the optical transmission line of the active system; a threshold decider to decide whether the input optical power to the optical transmission line of the active system detected by the input optical power monitor is not greater than the threshold set by the threshold setter or not; and an attenuation controller to carry out, when the threshold decider decides that the input optical power is not greater than the threshold, system switching by controlling the first variable optical attenuators so as to gradually reduce attenuation of the signal light rays input from the optical transmission line of the at least one backup system, and to gradually increase attenuation of the signal light rays input from the optical transmission line of the active system.

Advantages of the Invention

According to the present invention, with the configuration as described above, it can offer the optical transmission line switching apparatus and the optical transmission system with it capable of positively suppressing the power changes at the time of switching between the plurality of optical transmission lines of the active system and the backup system.

BEST MODE FOR CARRYING OUT THE INVENTION

The best mode for carrying out the invention will now be described with reference to the accompanying drawings.
Embodiment 1

Figure 1:
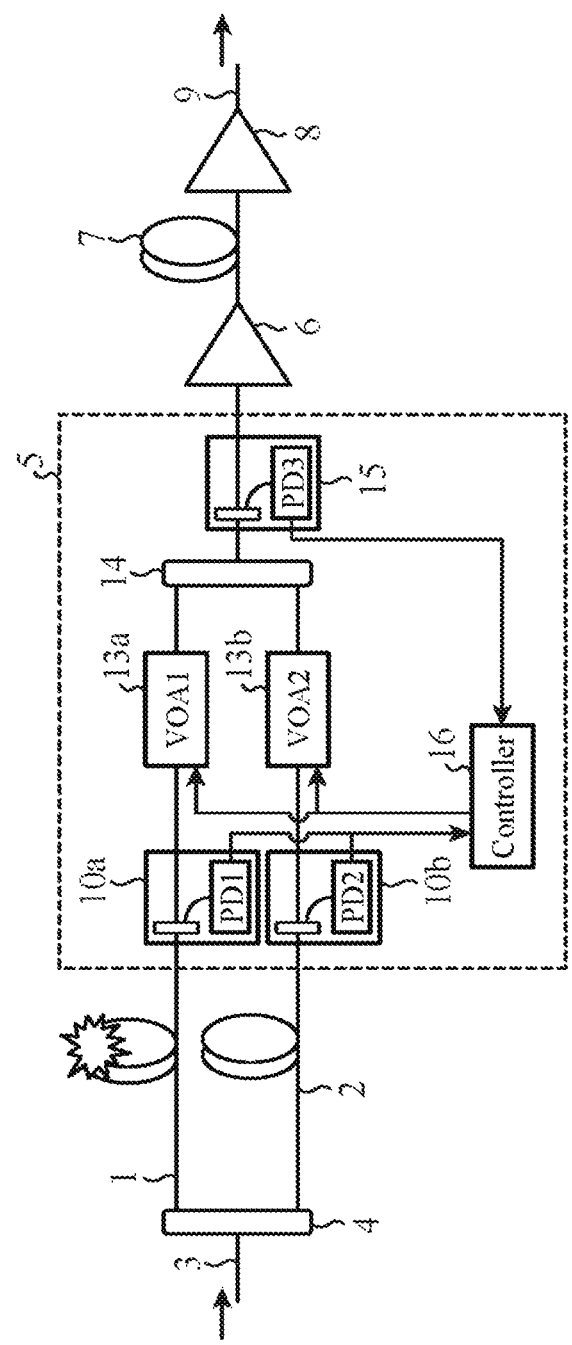
FIG. 1 is a block diagram showing a configuration of an optical transmission system with an optical transmission line switching apparatus of an embodiment 1 in accordance with the present invention.

FIG. 1 is a block diagram showing a configuration of an optical transmission system with an optical transmission line switching apparatus of an embodiment 1 in accordance with the present invention.

As shown in FIG. 1, the optical transmission system in accordance with the present invention comprises an optical branching device 4, optical transmission lines 1, 2 and 7, an optical transmission line switching apparatus 5, and optical amplifiers 6 and 8.

The optical branching device 4 receives at its input terminal 3 the signal light rays from an optical transmitter (not shown) outputting the signal light rays, and splits them into the optical transmission line 1 and optical transmission line 2. The optical transmission line switching apparatus 5 receives the signal light rays of the optical transmission lines 1 and 2 into which the optical branching device 4 splits the signal light rays, and switches between the optical transmission lines 1 and 2 if a failure occurs. The optical amplifiers 6 and 8, which are placed on the optical transmission line 7, respectively, amplify the signal light rays the optical transmission line switching apparatus 5 outputs, and the signal light rays amplified through the optical amplifiers 6 and 8 are output from an output point 9 to an optical receiver (not shown).

The optical transmission line switching apparatus 5 comprises input optical power monitors (PD1 and PD2) 10a and 10b, variable optical attenuators (VOA: referred to as first variable optical attenuators) 13a and 13b, a multiplexer (CPL: COUPLER) 14, an output optical power monitor 15, and a controller 16.

The input optical power monitors 10a and 10b, which are comprised of an optical branching device and a photodiode each, for example, can monitor the power (input optical power) of the signal light rays input through the two optical transmission lines (optical transmission line 1 and optical transmission line 2) as an electric signal.

The variable optical attenuators (VOA1 and VOA2) 13a and 13b, which are placed downstream of the input optical power monitors 10a and 10b, regulate the signal optical powers of the signal light rays input from the two optical transmission lines (optical transmission line 1 and optical transmission line 2) by attenuating them and then output them.

The multiplexer 14 multiplexes the signal light rays output from the variable optical attenuators 13a and 13b.

The output optical power monitor 15, which is placed at the output side of the multiplexer 14, monitors the power (output optical power) of the output light rays of the multiplexer 14.

Figure 2:
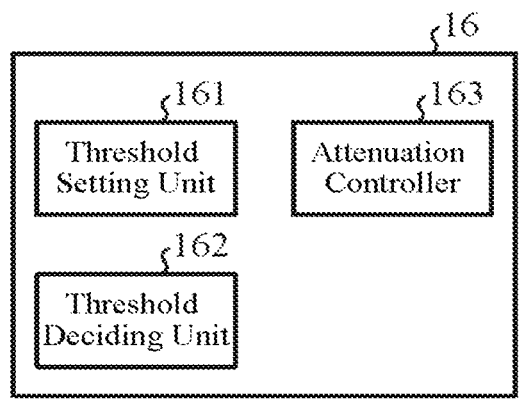
FIG. 2 is a block diagram showing a configuration of a controller of the embodiment 1.

FIG. 2 is a block diagram showing a configuration of the controller 16 of the embodiment 1.

As shown in FIG. 2, the controller 16 comprises a threshold setting unit 161, a threshold deciding unit 162, and an attenuation controller 163.

The threshold setting unit 161 sets a threshold of the input optical power to the optical transmission line 1 (2) of the active system, which optical power is detected by the input optical power monitor 10a (10b).

The threshold deciding unit 162 decides whether or not the input optical power to the optical transmission line 1 (2) of the active system detected by the input optical power monitor 10a (10b) is not greater than the threshold set by the threshold setting unit 161.

When the threshold deciding unit 162 decides that the input optical power to the optical transmission line 1 (2) of the active system monitored by the input optical power monitor 10a (10b) is not greater than the threshold, the attenuation controller 163 controls the variable optical attenuators 13a and 13b in such a manner as to gradually reduce the attenuation of the signal light rays input from the optical transmission line 2 (1) of the backup system, and to gradually increase the attenuation of the signal light rays input from the optical transmission line 1 (2) of the active system, thereby carrying out the system switching.

Next, the operation of the optical transmission line switching apparatus 5 of the embodiment 1 in accordance with the present invention will be described.

FIG. 3(a) shows the rate of change of the loss with time of the signal light rays attenuated through the variable optical attenuator 13a of the optical transmission line 1 of the active system in which a failure occurs, and the rate of change of the loss with time of the signal light rays attenuated through the variable optical attenuator 13b of the optical transmission line 2 of the backup system.

In addition, FIG. 3(b) shows the changes with time of the transmission optical power output from the multiplexer 14.

Figure 3:
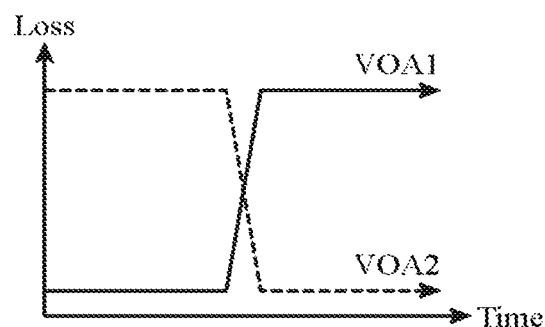
FIG. 3 is a diagram showing rates of changes of losses of variable optical attenuators with time, and an optical power output from a multiplexer at a time of switching between optical transmission lines.
Figure 3:
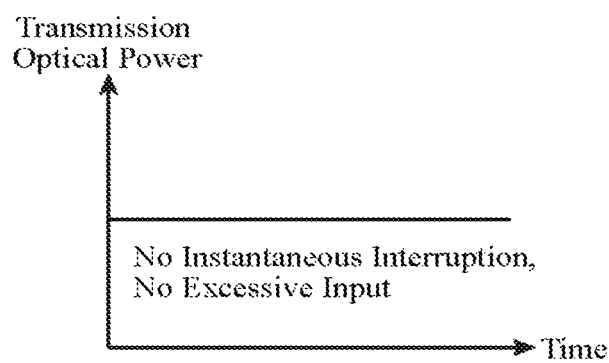

As an example, referring to FIGS. 1 and 3, the operation will be described below on the assumption that during the operation of the optical transmission line 1 as the active system (while the optical transmission line 2 works as the backup system), a sudden failure occurs on the optical transmission line 1 and the power of its signal light rays reduces, so that the optical transmission line is switched so as to use the optical transmission line 2 as the active system.

First, the attenuation controller 163 controls the attenuation of the variable optical attenuator 13*b* in such a manner as to put the loss of the signal light rays passing through the optical transmission line 2 at a predetermined loss, thereby placing the signal light rays of the optical transmission line 2 into a shutoff state. In addition, the attenuation controller 163 regulates the attenuation of the variable optical attenuator 13*a* in such a manner as to place the monitored value of the output optical power by the output optical power monitor 15 at a preset reference value. Incidentally, this state is one in which the optical transmission line 1 operates as the active system, and the optical transmission line 2 serves as the backup system.

In this state, if a sudden failure occurs on the optical transmission line 1 and the power of the signal light rays reduces, the input optical power monitor 10*a* detects the power reduction. If the input optical power the input optical power monitor 10*a* detects falls below the threshold set by the threshold setting unit 161, the threshold deciding unit 162 recognizes that a failure occurs, and the attenuation controller 163 gradually reduces the attenuation of the variable optical attenuator 13*b* as shown in FIG. 3(*a*). In contrast with this, as for the attenuation of the variable optical attenuator 13*a*, the attenuation controller 163 continues to regulate it in such a manner as to maintain the power of the output light rays detected by the output optical power monitor 15 at the preset reference value. More specifically, since the transmission optical power from the optical transmission line 2 increases because of the reduction in the attenuation of the variable optical attenuator 13*b*, the attenuation controller 163 controls the attenuation of the variable optical attenuator 13*a* in such a manner as to increase it gradually. As a result, as shown in FIG. 3(*b*), the output optical power from the multiplexer 14 is maintained at a fixed value.

Figure 4:
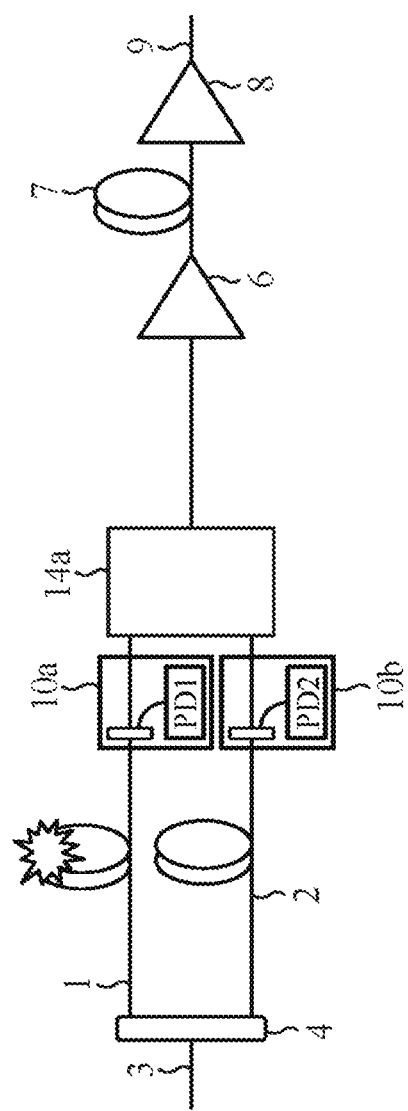
FIG. 4 is a diagram showing a configuration of an ordinary conventional optical transmission system with an optical transmission line switching apparatus.

Here, FIG. 4 is a diagram showing a configuration of an ordinary conventional optical transmission system with an optical transmission line switching apparatus 14*a*. In the ordinary conventional optical transmission system, the optical transmission line switching apparatus 14*a* is configured in such a manner as to select one of the two optical transmission lines (the optical transmission line 1 and the optical transmission line 2) as the optical transmission line of the active system. Incidentally, in FIG. 4, the same components as those described in FIG. 1 are designated by the same reference numerals and the detailed description of them will be omitted.

Figure 5:
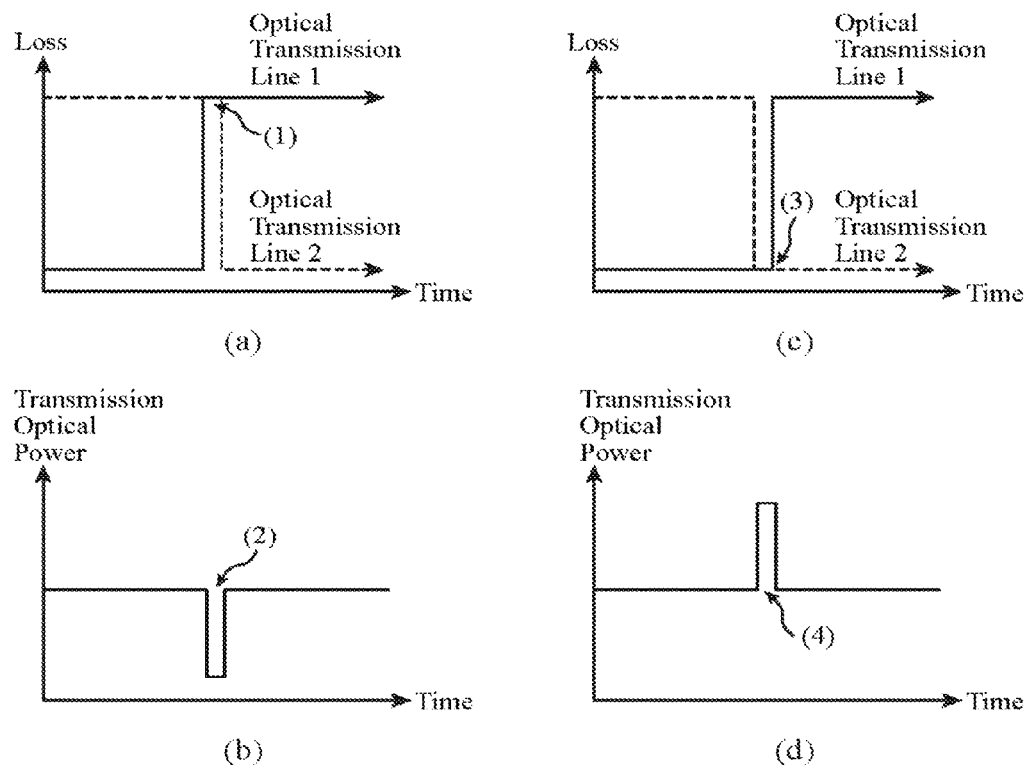
FIG. 5 is a diagram showing losses of two optical transmission lines and changes of transmission optical power with time when switching between the optical transmission lines in a conventional optical transmission line switching apparatus.

FIG. 5 is a diagram showing the losses of the two optical transmission lines 1 and 2 at the time of switching between the optical transmission lines 1 and 2 in the conventional optical transmission line switching apparatus 14*a* as shown in FIG. 4, and the changes in the transmission optical power with time.

FIG. 5(*a*) and FIG. 5(*b*) show an example in which the loss of the optical transmission line 1 increases and then the loss of the optical transmission line 2 reduces. In other words, it is an example in which when the optical transmission line switching apparatus 14*a* detects a failure on the optical transmission line 1, and switches the active system from the optical transmission line 1 to the optical transmission line 2, it places the optical transmission line 1 at a shutoff state, first, and then reduces the attenuation of the optical transmission line 2 to the reference value. In this case, since both the optical transmission line 1 and optical transmission line 2 have a maximum loss at the same time ((1) of FIG. 5(*a*)), and an instantaneous interruption occurs in the transmission optical power ((2) of FIG. 5(*b*)), there is a danger that an optical surge can occur in the downstream optical amplifier.

FIG. 5(*c*) and FIG. 5(*d*) show an example in which the loss of the optical transmission line 1 increases after the loss of the optical transmission line 2 reduces. In other words, it is an example in which when the optical transmission line switching apparatus 14*a* detects a failure on the optical transmission line 1, and switches the active system from the optical transmission line 1 to the optical transmission line 2, it reduces the attenuation of the optical transmission line 2 to the reference value, first, and then places the optical transmission line 1 at a shutoff state. In this case, both the optical transmission line 1 and optical transmission line 2 have a minimum loss at the same time ((3) in FIG. 5(*c*)). Thus, as for the transmission optical power, the power transmitted downstream increases about twice temporarily ((4) of FIG. 5(*d*)).

In this way, at the time of switching between the optical transmission lines 1 and 2, the conventional optical transmission line switching apparatus 14*a* has to instantaneously select both extremes of attenuation such as minimizing the attenuation of the optical signal of the optical transmission line 1 to be used as the active system and maximizing the attenuation of the optical signal of the optical transmission line 2 to be used as the backup system. Thus, there is a danger of bringing about excessive transmission optical power and an optical surge, or an instantaneous interruption. In contrast with this, the optical transmission line switching apparatus 5 of the embodiment 1 in accordance with the present invention gradually varies the attenuation by monitoring the variable optical attenuators 13*a* and 13*b* of both the optical transmission lines 1 and 2 so as to maintain the output optical power at constant. Thus, at the time of switching, the output optical power from the multiplexer 14 is maintained at a fixed value.

Let us return to the description of the operation. When the attenuation of the signal light rays of the optical transmission line 1 of the active system becomes equal to or greater than the set point, that is, when the signal light rays of the optical transmission line 1 reach the predetermined loss, or when the preset time has elapsed, the attenuation controller 163 fixes the attenuation of the variable optical attenuator 13*a* at the preset loss so as to bring the optical transmission line 1 into a shutoff state, and starts to regulate the attenuation of the variable optical attenuator 13*b* in such a manner as to maintain the power monitored value by the output optical power monitor 15 at the reference value. Thus, the switching between the optical transmission lines 1 and 2 is carried out, and brings about a state in which the optical transmission line 2 operates as the active system, and the optical transmission line 1 as the backup system.

Here, the threshold the threshold setting unit 161 sets for the input optical power monitor 10*a* to detect the power reduction in the present embodiment 1 will be described with reference to FIG. 6.

Figure 6:
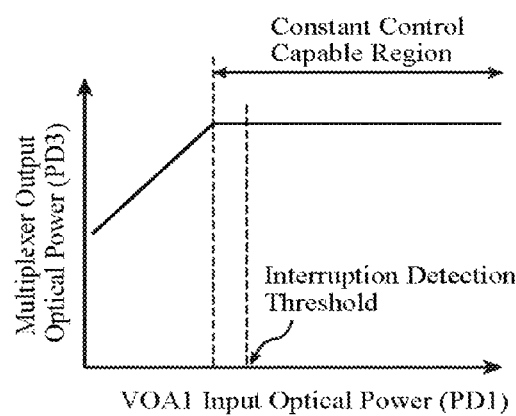
FIG. 6 is a diagram illustrating a threshold a threshold setting unit sets for an input optical power monitor to detect the power reduction in the embodiment 1.

In FIG. 6, the horizontal axis shows the input optical power (VOA1 input optical power) to the variable optical attenuator 13*a* the input optical power monitor 10*a* monitors, and the vertical axis shows the output optical power from the multiplexer 14 the output optical power monitor 15 monitors. Although the attenuation controller 163 regulates the output optical power from the variable optical attenuator 13a at a fixed value in a region where the VOA1 input optical power is high, it cannot regulate the output optical power at the fixed value in a region where the VOA1 input optical power is low and the output optical power deviates from the variable range of the variable optical attenuator 13a. In other words, there is a region of the input optical power that enables the variable optical attenuator 13a to regulate the output optical power as designated in FIG. 6 by a "constant control capable region". Even when the VOA1 input optical power is reducing, detecting the power reduction before deviating from the region and switching between the optical transmission lines 1 and 2 will enable switching between optical transmission lines 1 and 2 without reducing the output optical power. Accordingly, the threshold setting unit 161 can set the "interruption detection threshold" for detecting the power reduction within the constant control capable region as shown in FIG. 6, and uses the "interruption detection threshold" as the threshold for detecting the power reduction by the input optical power monitor 10a.

Incidentally, in FIG. 6, the minimum value of the VOA1 input optical power in the constant control capable region is not used as the "interruption detection threshold". The reason for this is to allow time for the input switching after the interruption detection.

As for the threshold for detecting the reduction in the input optical power to the variable optical attenuator 13b, the threshold setting unit 161 also sets it within the input optical power region that will enable regulation of the variable optical attenuator 13a.

Incidentally, as for the attenuation of the variable optical attenuator 13b (13a) to shut off the signal light rays of the optical transmission line 2 (1) of the backup system in the normal state, 25 db or more attenuation is necessary. If the optical signal passing through the optical transmission line 2 (1) of the backup system appears as crosstalk with the intensity of −25 db with respect to the signal light rays of the optical transmission line 1 (2) of the active system, the transmission characteristics of the signal light rays of the active system deteriorate by 0.4 db in terms of a Q-value under the condition with an OSNR of 14 db (resolution of 0.1 nm). Accordingly, to suppress the crosstalk light at a low value, it is necessary to set the attenuation of the variable optical attenuator 13b (13a) of the optical transmission line 2 (1) of the backup system at a large value to shut off its signal light rays.

As described above, according to the present embodiment 1, it comprises the threshold setting unit 161 that sets the threshold for the input optical power monitor 10a (10b) to detect the input optical power to the optical transmission line 1 (2) of the active system; the threshold deciding unit 162 that decides whether the input optical power to the optical transmission line 1 (2) of the active system detected by the input optical power monitor 10a (10b) is not greater than the threshold set by the threshold setting unit 161; and the attenuation controller 163 that carries out system switching, when the threshold deciding unit 162 decides that the input optical power is not greater than the threshold, by controlling the variable optical attenuators 13a and 13b in such a manner as to gradually reduce the attenuation of the signal light rays from the optical transmission line 2 (1) of one of the backup systems, and as to gradually increase the attenuation of the signal light rays input from the optical transmission line 1 (2) of the active system. Accordingly, at the time of switching between the optical transmission lines 1 and 2 in the event of detecting a sudden failure that reduces the optical power, it can avoid an instantaneous interruption of the signal light rays and an occurrence of the optical surge in the downstream optical amplifiers 6 and 8 without any special optical amplifiers 6 and 8 or any special changeover switch, thereby being able to maintain stability of the signal optical power input to the optical receiver.

Embodiment 2

Figure 7:
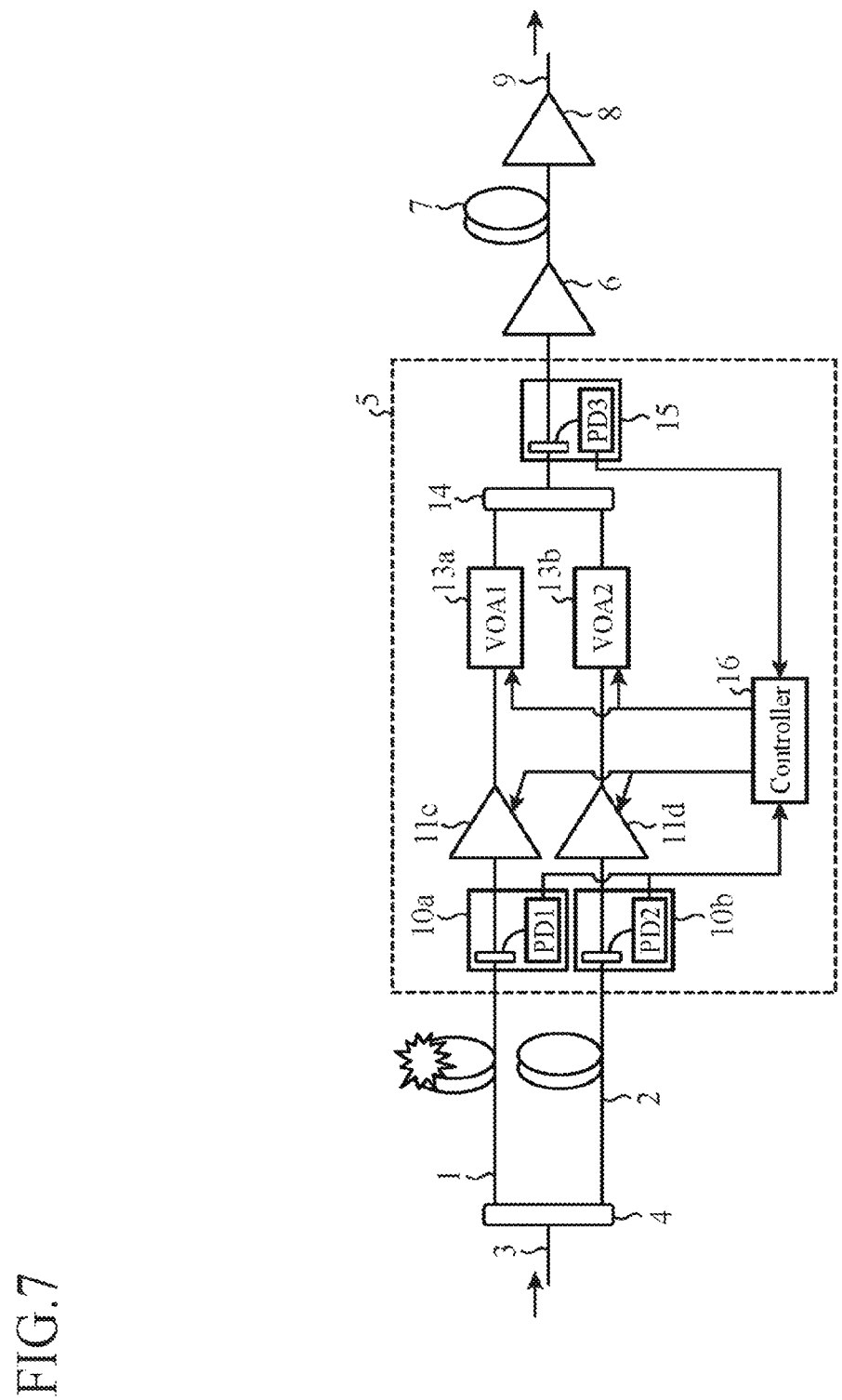
FIG. 7 is a block diagram showing a configuration of an optical transmission system with an optical transmission line switching apparatus of an embodiment 2 in accordance with the present invention.

FIG. 7 is a block diagram showing a configuration of an optical transmission system with an optical transmission line switching apparatus 5 of an embodiment 2 in accordance with the present invention.

The same components as those described in the embodiment 1 are designated by the same reference numerals and the duplicate description of them will be omitted.

The embodiment 2 described below differs from the embodiment 1 in that it further comprises optical amplifiers 11c and 11d that are placed between the input optical power monitors 10a and 10b and the variable optical attenuators 13a and 13b, respectively, to amplify the signal light rays input from the optical transmission lines 1 and 2.

With the configuration, it can broaden the region of the input optical power capable of regulating the variable optical attenuators 13a and 13b as compared with the embodiment 1, and can set a lower threshold for detecting the reduction in the input signal optical power.

As described above, according to the present embodiment 2, when the optical power reduces owing to a sudden failure, it can broaden the limit for completing the switching between the optical transmission lines 1 and 2.

Embodiment 3

Figure 8:
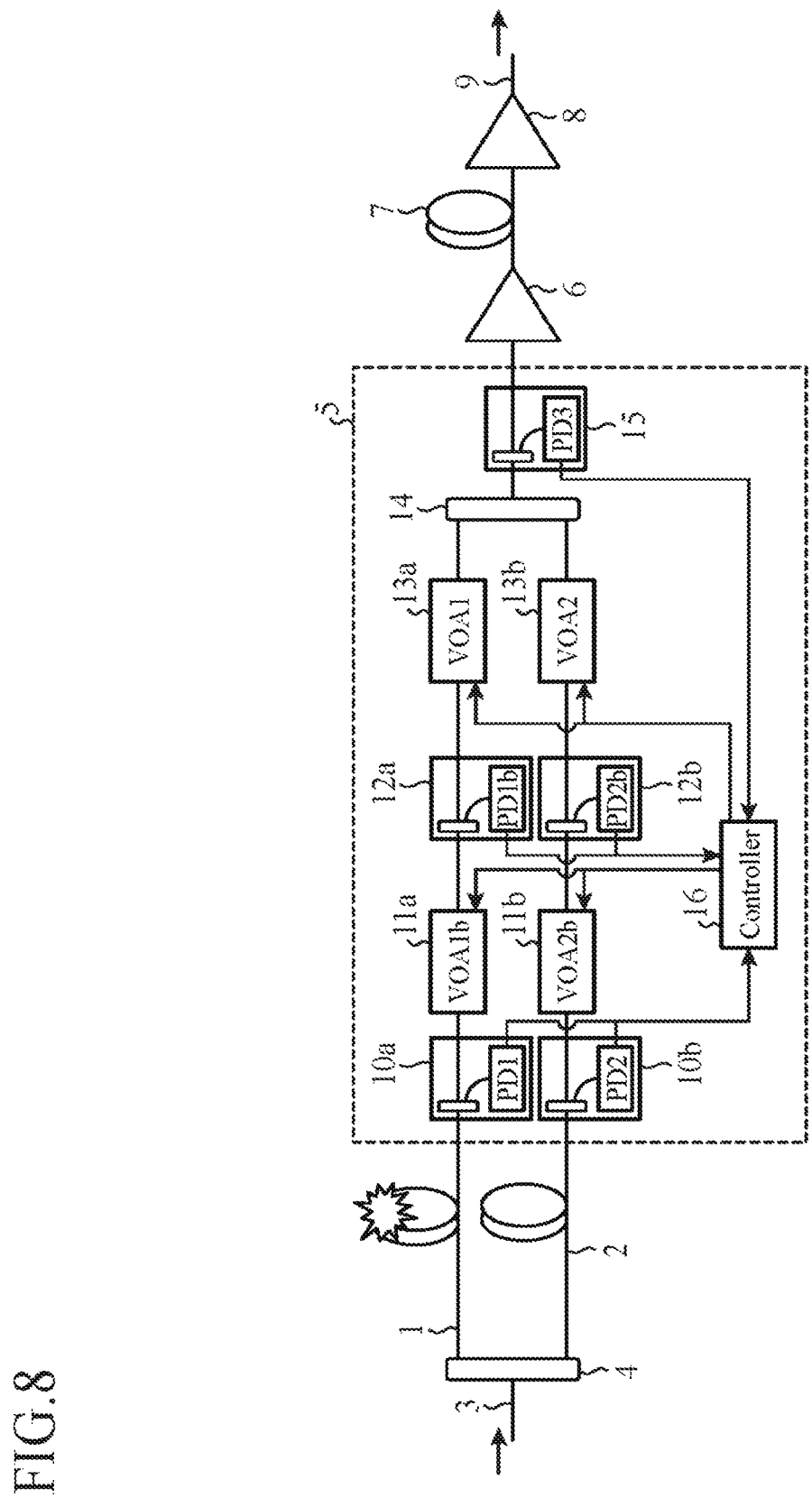
FIG. 8 is a block diagram showing a configuration of an optical transmission system with an optical transmission line switching apparatus of an embodiment 3 in accordance with the present invention.

FIG. 8 is a block diagram showing a configuration of an optical transmission system with an optical transmission line switching apparatus 5 of an embodiment 3 in accordance with the present invention.

The same components as those in FIG. 1 described in the embodiment 1 are designated by the same reference numerals and the redundant description of them will be omitted.

The embodiment 3 shown below differs from the embodiment 1 in that it further comprises variable optical attenuators (VOA1b and VOA2b which are referred to as second variable optical attenuators) 11a and 11b and intermediate optical power monitors (PD1b and PD2b) 12a and 12b.

The variable optical attenuators 11a and 11b are placed between the input optical power monitors 10a and 10b and the variable optical attenuators 13a and 13b on the optical transmission lines 1 and 2, respectively, to attenuate the signal light rays input from the two optical transmission lines (optical transmission line 1 and optical transmission line 2), thereby regulating and outputting the signal optical power.

The intermediate optical power monitors 12a and 12b are placed downstream of the variable optical attenuators 11a and 11b, respectively, to monitor the output optical powers of the light rays output from the variable optical attenuators 11a and 11b.

In addition, in the present embodiment 3, the attenuation controller 163 always controls the attenuation of the input light through the variable optical attenuator 11a so as to maintain the output optical power (intermediate optical power) the intermediate optical power monitor 12a monitors at a preset fixed value. Likewise, the attenuation controller 163 controls the attenuation of the input light through the variable optical attenuator 11b so as to maintain the output optical power (intermediate optical power) the intermediate optical power monitor 12b monitors at a preset fixed value.

The operation of the optical transmission line switching apparatus 5 of the embodiment 3 in accordance with the present invention will be described. Incidentally, the detailed description of the same operation as that described in the embodiment 1 will be omitted and only the operation different from that of the embodiment 1 will be described on the assumption that a sudden failure occurs on the optical transmission line 1 and the input optical power reduces during the operation using the optical transmission line 1 as the active system (the optical transmission line 2 operates as the backup system) as in the embodiment 1, and that the optical transmission lines 1 and 2 are switched to use the optical transmission line 2 as the active system (the optical transmission line 1 is brought into the backup system).

During the operation using the optical transmission line 1 as the active system, the attenuation controller 163 controls the attenuation of the input light through the variable optical attenuator 11*a* in such a manner as to maintain the output optical power (intermediate optical power) the intermediate optical power monitor 12*a* monitors at the preset fixed value.

Likewise, the attenuation controller 163 controls the attenuation of the input light through the variable optical attenuator 11*b* in such a manner as to maintain the output optical power (intermediate optical power) the intermediate optical power monitor 12*b* monitors at the preset fixed value.

If a sudden failure occurs on the optical transmission line 1 during the operation using the optical transmission line 1 as the active system (optical transmission line 2 is used as the backup system), the threshold deciding unit 162 detects the occurrence of the failure on the optical transmission line 1 of the active system by detecting the power reduction with the input optical power monitor 10*a* as in the embodiment 1. More specifically, it detects the failure by deciding whether the input optical power to the optical transmission line 1 the input optical power monitor 10*a* monitors falls below the threshold set by the threshold setting unit 161. Only, the present embodiment 3 differs in the setting method of the threshold by the threshold setting unit 161.

Figure 9:
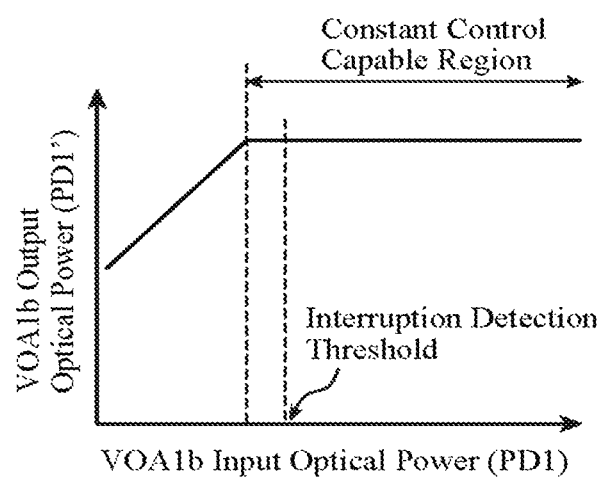
FIG. 9 is a diagram illustrating a threshold a threshold setting unit sets for an input optical power monitor to detect the power reduction in the embodiment 3.

FIG. 9 is a diagram illustrating a threshold a threshold setting unit sets for an input optical power monitor to detect the power reduction in the embodiment 3

In FIG. 9, the horizontal axis shows the input optical power (VOA1b input optical power) to the variable optical attenuator 11*a* the input optical power monitor 10*a* monitors, and the vertical axis shows the output optical power (intermediate optical power) of the variable optical attenuator 11*a* the intermediate optical power monitor 12*a* monitors.

Even when the VOA1*b* input optical power is reducing, detecting the power reduction and switching between the optical transmission lines 1 and 2 before it deviates from the region of the input optical power, which enables regulation of the variable optical attenuator 11*a*, will make it possible to switch between the optical transmission lines 1 and 2 without reducing the output optical power (intermediate optical power). Thus, the threshold setting unit 161 can set the "interruption detection threshold" for detecting the input optical power reduction within the constant control capable region as shown in FIG. 9.

More specifically, the threshold setting unit 161 sets as an "interruption detection threshold" the VOA1*b* input power value at which the output optical power value of the variable optical attenuator 11*a* the intermediate optical power monitor 12*a* detects deviates from the region in which the output optical power value is controllable within the constant control region, and the threshold deciding unit 162 decides that a failure occurs if the input optical power to the input optical power monitor 10*a* falls below the "interruption detection threshold".

Thus, although the embodiment 1 sets the "interruption detection threshold" within the region capable of regulating the output optical power value of the multiplexer 14 the output optical power monitor 15 detects within the constant control capable region, the threshold setting unit 161 in the present embodiment 3 sets the "interruption detection threshold" in accordance with the output optical power (intermediate optical power) value of the variable optical attenuator 11*a* the intermediate optical power monitor 12*a* monitors.

Incidentally, the "interruption detection threshold" is not set at the minimum value of the VOA1*b* input power in the constant control capable region in order to allow time for completing the switching between the optical transmission lines 1 and 2.

Likewise, when the optical transmission line 2 is used as the active system, the threshold setting unit 161 sets the "interruption detection threshold" for detecting the input optical power reduction within the region of the input optical power, which enables regulating the variable optical attenuator 11*b*.

When the threshold deciding unit 162 decides that the input optical power to the input optical power monitor 10*a* falls below the "interruption detection threshold", the attenuation controller 163 controls in such a manner as to gradually reduce the attenuation of the variable optical attenuator 13*b*, and at the same time to gradually increase the attenuation of the variable optical attenuator 13*a*, thereby carrying out the switching between the optical transmission lines 1 and 2, which is the same as described in the embodiment 1.

As described above, according to the present embodiment 3, it is configured in such a manner that it further comprises the variable optical attenuators 11*a* and 11*b* that are placed between the input optical power monitors 10*a* and 10*b* and the variable optical attenuators 13*a* and 13*b* on the optical transmission lines 1 and 2, respectively, for attenuating the signal light rays input from the optical transmission lines 1 and 2; and the intermediate optical power monitors 12*a* and 12*b* that are placed downstream of the variable optical attenuators 11*a* and 11*b*, respectively, for monitoring the output optical powers of the output light rays output by the variable optical attenuators 11*a* and 11*b*, and that the attenuation controller 163 controls the variable optical attenuators 11*a* and 11*b* in such a manner as to maintain the output optical power the intermediate optical power monitors 12*a* and 12*b* monitor at the set point. Accordingly, it can switch between the optical transmission lines 1 and 2 of the active system and the backup system on the basis of the more stable signal light rays.

Embodiment 4

Figure 10:
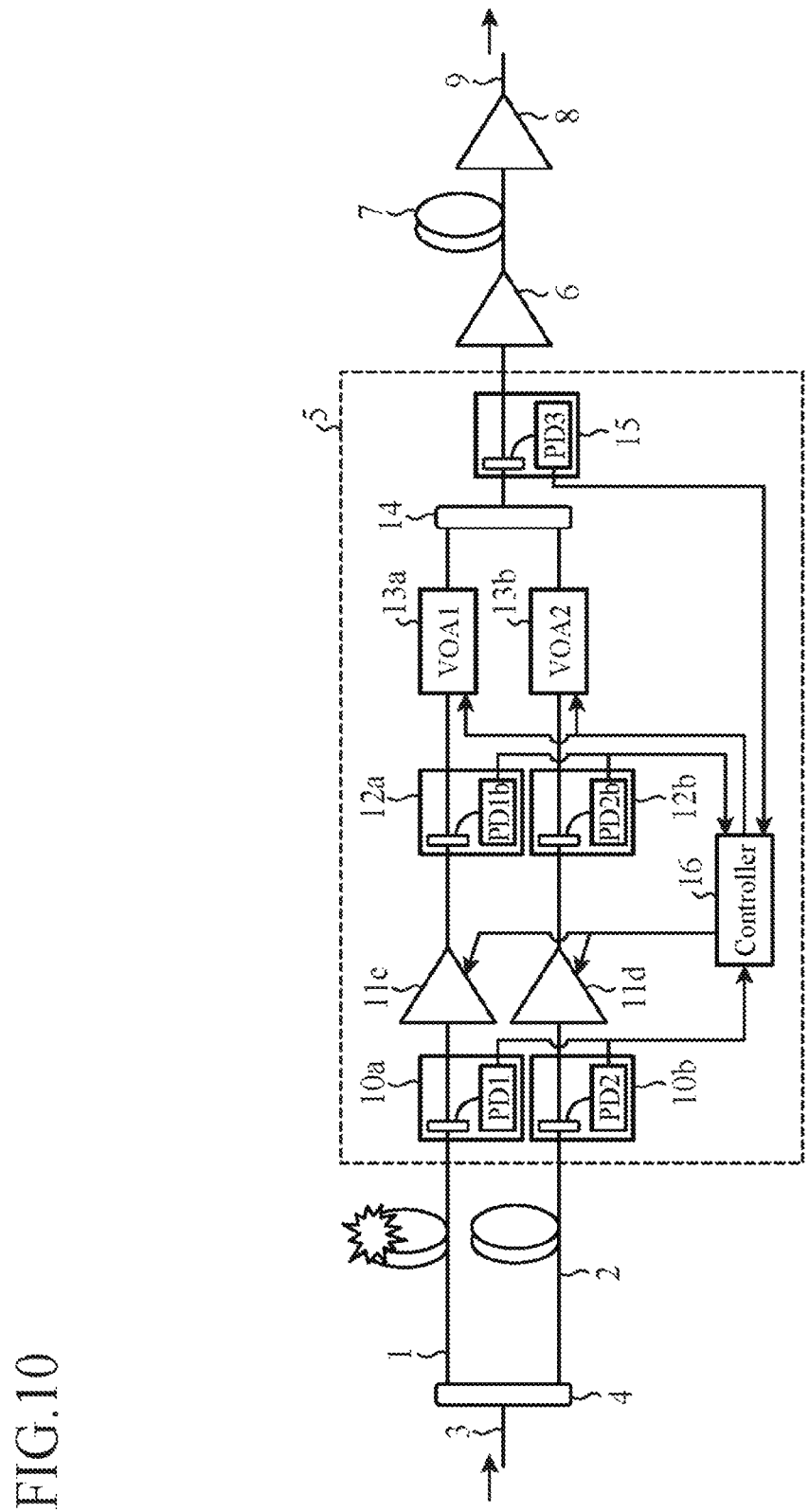
FIG. 10 is a block diagram showing a configuration of an optical transmission system with an optical transmission line switching apparatus of an embodiment 4 in accordance with the present invention.

FIG. 10 is a block diagram showing a configuration of an optical transmission system with the optical transmission line switching apparatus 5 of an embodiment 4 in accordance with the present invention.

The same components as those described in FIG. 8 in the embodiment 3 are designated by the same reference numerals and the redundant description of them will be omitted.

The embodiment 4 shown below differs from the embodiment 3 in that it comprises the optical amplifiers 11*c* and 11*d* shown in FIG. 7 described in the embodiment 2 instead of the variable optical attenuators 11*a* and 11*b*.

In addition, in the present embodiment 4, the attenuation controller 163 regulates the output power of the optical amplifier 11*c* in such a manner as to maintain the power monitored value by the intermediate optical power monitor 12*a* at a preset reference value. In addition, the attenuation controller 163 regulates the output power of the optical amplifier 11d in such a manner as to maintain the power monitored value by the intermediate optical power monitor 12b at a preset reference value.

The operation of the optical transmission line switching apparatus 5 of the embodiment 4 in accordance with the present invention will now be described. Incidentally, the detailed description of the same operation as that described in the embodiment 3 will be omitted and only the operation different from that of the embodiment 3 will be described on the assumption as in the embodiment 3 that a sudden failure occurs on the optical transmission line 1 and the input optical power reduces during the operation using the optical transmission line 1 as the active system (the optical transmission line 2 operates as the backup system) as in the embodiment 1, and that the optical transmission lines 1 and 2 are switched to use the optical transmission line 2 as the active system (using the optical transmission line 1 as the backup system).

During the operation using the optical transmission line 1 as the active system, the attenuation controller 163 regulates the output power of the optical amplifier 11c in such a manner as to maintain the power monitored value by the intermediate optical power monitor 12a at a preset reference value. In addition, the attenuation controller 163 regulates the output power of the optical amplifier 11d in such a manner as to maintain the power monitored value by the intermediate optical power monitor 12b at a preset reference value.

If a sudden failure occurs on the optical transmission line 1 during the operation using the optical transmission line 1 as the active system (optical transmission line 2 is used as the backup system), the threshold deciding unit 162 detects the occurrence of the failure on the optical transmission line 1 of the active system by detecting the power reduction with the input optical power monitor 10a as in the embodiment 3. More specifically, it detects the failure by deciding that the input optical power to the optical transmission line 1 the input optical power monitor 10a monitors falls below the threshold set by the threshold setting unit 161. Only, it differs from the embodiment 3 in the setting method of the threshold by the threshold setting unit 161.

When the input optical power is reducing, and if the threshold setting unit 161 detects the power reduction and switches between the optical transmission lines 1 and 2 before the input optical power deviates from the region capable of regulating the optical amplification, the switching between the optical transmission lines 1 and 2 can be performed without reducing the multiplexer output power. Accordingly, the threshold setting unit 161 sets the "interruption detection threshold" for detecting the input optical power reduction within the constant control capable region within which the optical amplifier 11c can achieve its control.

More specifically, the threshold setting unit 161 sets as an "interruption detection threshold" the value of the input optical power at which the signal light output power value of the optical amplifier 11c the intermediate optical power monitor 12a detects deviates from the range capable of regulating the signal light output power within the constant control capable region, and if the input optical power to the input optical power monitor 10a falls below the "interruption detection threshold", the threshold deciding unit 162 decides that the input optical power to the optical transmission line 1 the input optical power monitor 10a monitors falls below the threshold, thereby deciding that a failure occurs.

Likewise, when the optical transmission line 2 is used as the active system, the threshold setting unit 161 sets the "interruption detection threshold" for detecting the input optical power reduction within the region of the input optical power in which the optical amplifier 12d is able to achieve the regulation.

When the threshold deciding unit 162 decides that the input optical power to the input optical power monitor 10a falls below the "interruption detection threshold", the attenuation controller 163 controls in such a manner as to gradually reduce the attenuation of the variable optical attenuator 13b, and at the same time to gradually increase the attenuation of the variable optical attenuator 13a, thereby carrying out the switching between the optical transmission lines 1 and 2, which is the same as described in the embodiment 1 or 3.

As described above, according to the present embodiment 4, it is configured in such a manner that it further comprises the optical amplifiers 11c and 11d that are placed between the input optical power monitors 10a and 10b and the variable optical attenuators 13a and 13b on the optical transmission lines 1 and 2, respectively, for amplifying the signal light rays input from the optical transmission lines 1 and 2; and the intermediate optical power monitors 12a and 12b that are placed downstream of the optical amplifiers 11c and 11d, respectively, for monitoring the output optical powers of the output light rays output from the optical amplifiers 11c and 11d, and that the attenuation controller 163 controls the optical amplifiers 11c and 11d in such a manner as to maintain the output optical powers the intermediate optical power monitors 12a and 12b monitor at the set points. Accordingly, it can switch between the optical transmission lines 1 and 2 of the active system and the backup system on the basis of the more stable signal light rays just as the embodiment 3. In addition, when the optical power reduces owing to a sudden failure, it can broaden the limit for completing the switching between the optical transmission lines 1 and 2.

Embodiment 5

Figure 11:
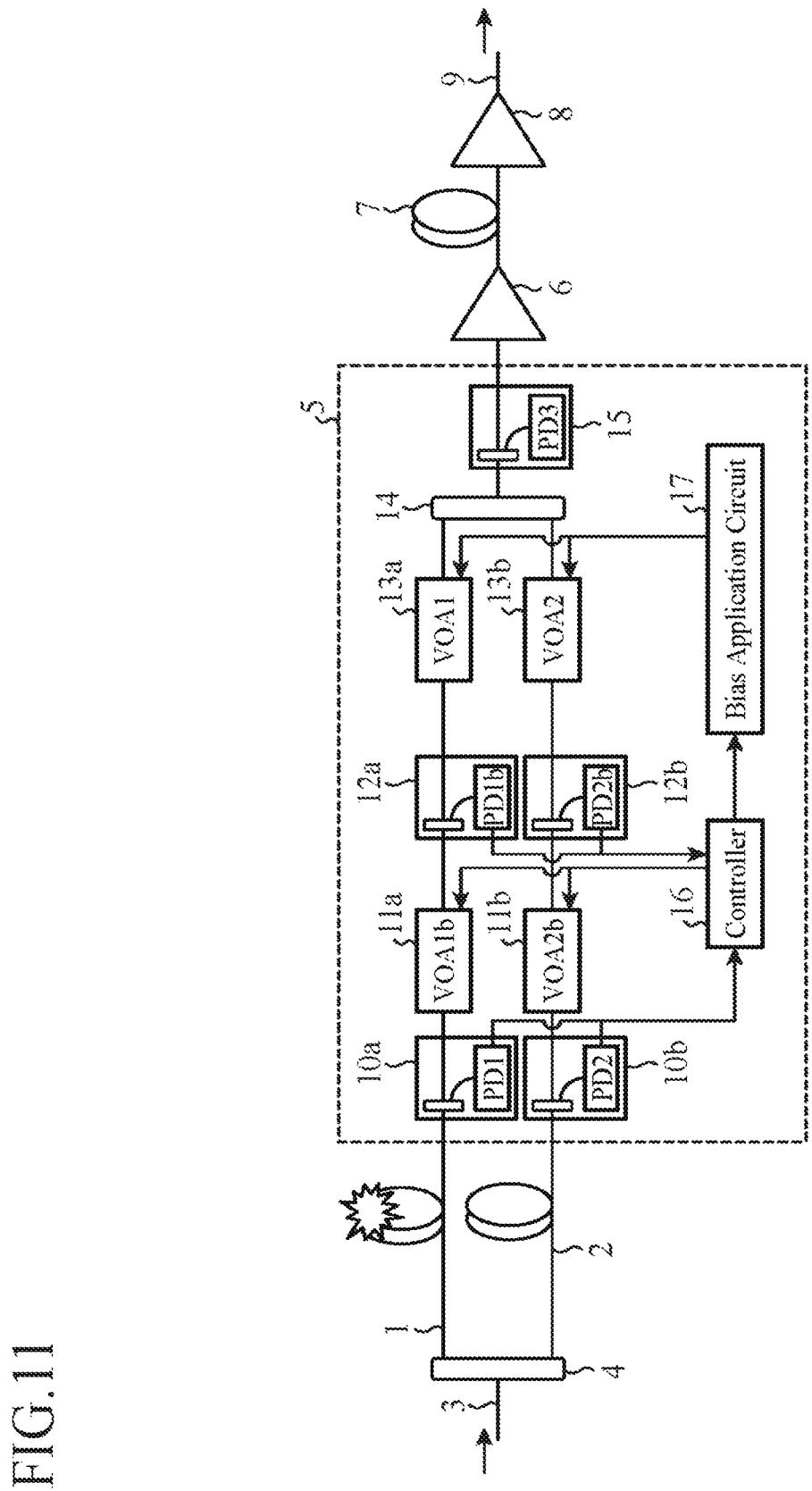
FIG. 11 is a block diagram showing a configuration of an optical transmission system with an optical transmission line switching apparatus of an embodiment 5 in accordance with the present invention.

FIG. 11 is a block diagram showing a configuration of an optical transmission system with an optical transmission line switching apparatus 5 of an embodiment 5 in accordance with the present invention.

The same components as those shown in FIG. 8 described in the embodiment 3 are designated by the same reference numerals and the redundant description of them will be omitted.

The embodiment 5 shown below differs from the embodiments 1-4 in that it further comprises a bias application circuit 17.

In addition, although the attenuation controller 163 directly controls the variable optical attenuators 13a and 13b in the embodiments 1-4, the present embodiment 5 differs in that the attenuation controller 163 controls the voltage or current to be applied to the bias application circuit 17, thereby controlling the variable optical attenuators 13a and 13b indirectly.

According to an instruction of the attenuation controller 163, the bias application circuit 17 applies the same bias voltage or current to the variable optical attenuators 13a and 13b.

Incidentally, as for the variable optical attenuators 13a and 13b in the present embodiment 5, similar variable optical attenuator devices with characteristics complementary to each other are used.

The operation of the optical transmission line switching apparatus 5 of the embodiment 5 in accordance with the present invention will be described.

As in the embodiments 1-4, as for a system which uses the optical transmission line 1 as the active system and the optical transmission line 2 as the backup system, the operation will be described when a failure occurs on the optical transmission line 1 of the active system.

During the operation using the optical transmission line 1 as the active system, the attenuation controller 163 controls the attenuation of the input light through the variable optical attenuator 11a in such a manner as to maintain the output optical power (intermediate optical power) the intermediate optical power monitor 12a monitors at the preset fixed value.

Likewise, the attenuation controller 163 controls the attenuation of the input light through the variable optical attenuator 11b in such a manner as to maintain the output optical power (intermediate optical power) the intermediate optical power monitor 12b monitors at the preset fixed value.

Incidentally, in the present embodiment 5, the output optical power (intermediate optical power) the intermediate optical power monitor 12a monitors and the output optical power (intermediate optical power) the intermediate optical power monitor 12b outputs are adjusted at the same value. In other words, the attenuation controller 163 controls the variable optical attenuators 11a and 11b in such a manner as to equalize the output optical power the intermediate optical power monitor 12a monitors with the output optical power (intermediate optical power) the intermediate optical power monitor 12b monitors.

If a sudden failure occurs on the optical transmission line 1 during the operation using the optical transmission line 1 as the active system (optical transmission line 2 is used as the backup system), the threshold deciding unit 162 detects the failure by detecting the power reduction with the input optical power monitor 10a, that is, by detecting that the input optical power to the optical transmission line 1 the input optical power monitor 10a monitors falls below the threshold the threshold setting unit 161 sets.

More specifically, as in the embodiment 3, the threshold setting unit 161 sets as an "interruption detection threshold" the VOA1b input power value at which the output optical power value of the variable optical attenuator 11a the intermediate optical power monitor 12a detects deviates from the region in which the output optical power value is controllable within the constant control region, and the threshold deciding unit 162 decides that a failure occurs if the input optical power to the input optical power monitor 10a falls below the "interruption detection threshold" (see FIG. 9).

Incidentally, the "interruption detection threshold" is not set at the minimum value of the VOA1b input power in the constant control capable region in order to allow time for completing the switching between the optical transmission lines 1 and 2.

Likewise, when the optical transmission line 2 is used as the active system, the threshold setting unit 161 sets the "interruption detection threshold" for detecting the input optical power reduction within the region of the input optical power in which the variable optical attenuator 11b can be regulated.

If a sudden failure occurs on the optical transmission line 1 and the power of the signal light rays reduces in the state in which the optical transmission line 1 operates as the active system and the optical transmission line 2 as the backup system, and when the threshold deciding unit 162 decides that the input optical power the input optical power monitor 10a detects falls below the threshold (interruption detection threshold), the attenuation controller 163 alters the bias voltage to be applied to the variable optical attenuators 13a and 13b (or a bias current depending on the variable optical attenuators 13a and 13b) via the bias application circuit 17 in accordance with the output optical power (intermediate optical power) the intermediate optical power monitor 12a detects and the output optical power (intermediate optical power) the intermediate optical power monitor 12b detects.

Figure 12:
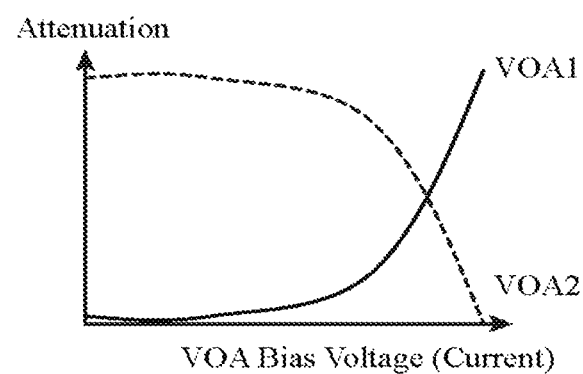
FIG. 12 is a diagram showing relationships between a bias voltage (current) and attenuation of variable optical attenuators.

FIG. 12 is a diagram showing relationships between the bias voltage (current) and the attenuation of the variable optical attenuators 13a and 13b.

In FIG. 12, the horizontal axis shows the bias voltage (current) applied from the bias application circuit 17 to the variable optical attenuators 13a and 13b, and the vertical axis shows the attenuation of the variable optical attenuator 13a and that of the variable optical attenuator 13b.

Since the variable optical attenuators 13a and 13b are similar variable optical attenuator devices and have characteristics complementary to each other, vertically symmetrical characteristics can be obtained which make the sum of the attenuation a fixed value. Accordingly, the controller can control the attenuation of both the variable optical attenuators 13a and 13b complementarily.

When a reduction in the input optical power to the optical transmission line 1 is detected in the state using the optical transmission line 1 as the active system and the optical transmission line 2 as the backup system, that is, in the state in which the attenuation of the variable optical attenuator 13a of the optical transmission line 1 is minimum and the attenuation of the variable optical attenuator 13b of the optical transmission line 2 is maximum, the bias application circuit 17 can increase the attenuation of the variable optical attenuator 13a and reduce the attenuation of the variable optical attenuator 13b as shown in FIG. 12 by raising the bias voltage (current) applied to the variable optical attenuators 13a and 13b, thereby being able to carry out the switching that changes the optical transmission line 2 to the active system and the optical transmission line 1 to the backup system.

Thus, the attenuation controller 163 can gradually increase the attenuation of the variable optical attenuator 13a and can gradually reduce the attenuation of the variable optical attenuator 13b by causing the bias application circuit 17 under its control to raise the bias voltage (current), thereby being able to carry out the system switching.

In addition, since the two variable optical attenuators 13a and 13b are similar variable optical attenuators that are controlled complementarily, the signal optical power output from the multiplexer 14 is maintained at a fixed value.

Thus, the attenuation controller 163 can switch between the optical transmission lines 1 and 2 of the active system and backup system while maintaining the output of the transmission optical power at the fixed value by only controlling the bias voltage (current) output from the bias application circuit 17 without monitoring changes in the losses of the variable optical attenuators 13a and 13b at every time interval and without controlling the attenuation of the variable optical attenuators 13a and 13b directly to make the output optical power constant.

Incidentally, although the configuration is described here which comprises the variable optical attenuators 11a and 11b and the intermediate optical power monitors 12a and 12b, in which the attenuation controller 163 receives the signal light rays from the optical transmission line 1 of the active system and the optical transmission line 2 of the backup system, and controls the output optical powers (intermediate optical powers) the variable optical attenuators 11*a* and 11*b* output at the predetermined set points, respectively, this is not essential. For example, a configuration is also possible which does not comprise the variable optical attenuators 11*a* and 11*b* nor the intermediate optical power monitors 12*a* and 12*b*. However, the configuration, which comprises the variable optical attenuators 11*a* and 11*b* and the intermediate optical power monitors 12*a* and 12*b*, maintains the output optical powers (intermediate optical powers) the variable optical attenuators 11*a* and 11*b* output at the fixed values, and controls the attenuation by applying the bias voltage (current) to the variable optical attenuators 13*a* and 13*b* that are complementary to each other in response to the fixed input light, can achieve the fixed output transmission optical power more easily.

As described above, according to the present embodiment 5, it uses the variable optical attenuators 13*a* and 13*b* which are similar variable optical attenuator devices with characteristics complementary to each other, and further comprises the bias application circuit 17 that applies the voltage or current to the variable optical attenuators 13*a* and 13*b*, wherein the attenuation controller 163 controls, when the threshold deciding unit 162 decides that the input optical power is not greater than the threshold, the variable optical attenuators 13*a* and 13*b* by controlling the voltage or current applied to the bias application circuit 17 in such a manner as to gradually reduce the attenuation of the signal light rays input from the optical transmission line 2 (1) of the backup system, and to gradually increase the attenuation of the signal light rays input from the optical transmission line 1 (2) of the active system. Thus, the attenuation controller 163 can carry out the switching between the optical transmission lines 1 and 2 of the active system and the backup system while maintaining the signal optical power output from the multiplexer 14 at the fixed value more easily, by only controlling the application of the bias voltage (current) input to the variable optical attenuators 13*a* and 13*b* that are complementarily controlled.

Alternatively, instead of the variable optical attenuators 11*a* and 11*b* shown in FIG. 11, a configuration is also possible which comprises the optical amplifiers 11*c* and 11*d* as shown in FIG. 7 or 10. In this case, the configuration differs only in that the "interruption detection threshold" the threshold setting unit 161 sets is determined at the input optical power value to the optical amplifier 11*c* or 11*d*, at which the output optical power value of the optical amplifier 11*c* or 11*d* the intermediate optical power monitor 12*a* or 12*b* monitors deviates from the region capable of controlling the output optical power value within the constant control region. The other operation is the same as that of the configuration comprising the variable optical attenuators 11*a* and 11*b* as described above.

The configuration comprising the optical amplifiers 11*c* and 11*d* shown in FIG. 7 or 9 instead of the variable optical attenuators 11*a* and 11*b* can carry out the switching between the optical transmission lines 1 and 2 more easily, and can broaden the limit for completing the switching between the optical transmission lines 1 and 2 when the optical power reduces because of a sudden failure.

Incidentally, although the foregoing embodiments 1-5 describe only examples that comprise two optical transmission lines 1 and 2 and use one of them as the active system and the other as the backup system, this is not essential. For example, a configuration is also possible which comprises three or more optical transmission lines and uses one of them as the active system and the remainder as the backup system. When a failure occurs on the optical transmission line of the active system, switching is carried out so as to use one of the optical transmission lines of the remaining backup system as the active system, which is within the scope of the present invention.

Incidentally, it is to be understood that a free combination of the individual embodiments, variations of any components of the individual embodiments or removal of any components of the individual embodiments is possible within the scope of the present invention.

INDUSTRIAL APPLICABILITY

An optical transmission line switching apparatus and an optical transmission system in accordance with the present invention offers an optical transmission line switching apparatus capable of positively suppressing the power changes at the time of switching between a plurality of optical transmission lines of the active system and backup system, and an optical transmission system including the optical transmission line switching apparatus. Accordingly, they are suitable for application to an optical transmission line switching apparatus or an optical transmission system including it, which switches between a plurality of optical transmission lines between the active system and backup system, and outputs signal light rays to a downstream optical repeater.

DESCRIPTION OF REFERENCE SYMBOLS

1, 2 optical transmission line; 3 input terminal; 4 optical branching device; 5, 14*a* optical transmission line switching apparatus; 6, 8, 11*c*, 11*d* optical amplifier; 9 output point; 10*a*, 10*b* input optical power monitor; 11*a*, 11*b*, 13*a*, 13*b* variable optical attenuator; 12*a*, 12*b* intermediate optical power monitor; 14 multiplexer; 15 output optical power monitor; 16 controller; 161 threshold setting unit; 162 threshold deciding unit; 163 attenuation controller; 17 bias application circuit.

What is claimed is:

1. An optical transmission line switching apparatus to carry out system switching between an optical transmission line of a single active system and an optical transmission line of at least one backup system, the optical transmission line switching apparatus comprising:
   input optical power monitors that are provided to the optical transmission lines, respectively, to monitor input optical powers of signal light rays input from the optical transmission lines;
   first variable optical attenuators that are placed downstream of the input optical power monitors, respectively, to attenuate and output the signal light rays input from the optical transmission lines;
   a multiplexer to multiplex the signal light rays output from the first variable optical attenuators;
   a threshold setter to set a threshold for the input optical power monitor to detect the input optical power to the optical transmission line of the active system;
   a threshold decider to decide whether the input optical power to the optical transmission line of the active system detected by the input optical power monitor is not greater than the threshold set by the threshold setter or not; and
   an attenuation controller to carry out, when the threshold decider decides that the input optical power is not greater than the threshold, system switching by controlling the first variable optical attenuators so as to gradually reduce attenuation of the signal light rays input from the optical transmission line of the at least one backup system, and to gradually increase attenuation of the signal light rays input from the optical transmission line of the active system.

2. The optical transmission line switching apparatus according to claim 1, further comprising:
an output optical power monitor that are placed at an output side of the multiplexer to monitor output optical power from the multiplexer, wherein
the attenuation controller controls, when the threshold decider decides that the input optical power is not greater than the threshold, the first variable optical attenuators so as to maintain the output optical power at a set point by reducing the attenuation of the signal light rays input from the optical transmission line of the at least one backup system, and by increasing the attenuation of the signal light rays input from the optical transmission line of the active system.

3. The optical transmission line switching apparatus according to claim 1, further comprising:
optical amplifiers that are placed between the input optical power monitors and the first variable optical attenuators on the optical transmission lines, respectively, to amplify the signal light rays input from the optical transmission lines.

4. The optical transmission line switching apparatus according to claim 2, wherein
the threshold setter sets the threshold within a region of the input optical power, in which the attenuation controller is able to regulate the first variable optical attenuators so as to maintain the output optical power at the set point.

5. The optical transmission line switching apparatus according to claim 1, further comprising:
second variable optical attenuators that are placed between the input optical power monitors and the first variable optical attenuators on the optical transmission lines, respectively, to attenuate and then output the signal light rays input from the optical transmission lines; and
first intermediate optical power monitors that are placed downstream of the second variable optical attenuators, respectively, to monitor the output optical powers of the output light rays output by the second variable optical attenuators, wherein
the attenuation controller controls the second variable optical attenuators so as to maintain the output optical powers the first intermediate optical power monitors monitor at set points.

6. The optical transmission line switching apparatus according to claim 1, further comprising:
optical amplifiers that are placed between the input optical power monitors and the first variable optical attenuators on the optical transmission lines, respectively, to amplify the signal light rays input from the optical transmission lines; and
second intermediate optical power monitors that are placed downstream of the optical amplifiers, respectively, to monitor the output optical powers of the output light rays output from the optical amplifiers, wherein
the attenuation controller controls the optical amplifiers so as to maintain the output optical powers the second intermediate optical power monitors monitor at set points.

7. The optical transmission line switching apparatus according to claim 5, wherein
the threshold setter sets the threshold within a region of the input optical power, in which the attenuation controller is able to control the second variable optical attenuators so as to maintain the output optical powers the first intermediate optical power monitors monitor at the set points.

8. The optical transmission line switching apparatus according to claim 6, wherein
the threshold setter sets the threshold within a region of the input optical power, in which the attenuation controller is able to control the optical amplifiers so as to maintain the output optical powers the second intermediate optical power monitors monitor at the set points.

9. The optical transmission line switching apparatus according to claim 1, wherein
the first variable optical attenuators are similar variable optical attenuator devices with characteristics complementary to each other;
the optical transmission line switching apparatus further comprises a bias application circuit to apply a voltage or current to the first variable optical attenuators; and
the attenuation controller controls, when the threshold decider decides that the input optical power is not greater than the threshold, the first variable optical attenuators by controlling a voltage or current applied to the bias application circuit so as to gradually reduce the attenuation of the signal light rays input from the optical transmission line of at least one backup system, and to gradually increase the attenuation of the signal light rays input from the optical transmission line of the active system.

10. The optical transmission line switching apparatus according to claim 9, further comprising:
second variable optical attenuators that are placed between the input optical power monitors and the first variable optical attenuators on the optical transmission lines, respectively, to attenuate and then output the signal light rays input from the optical transmission lines; and
first intermediate optical power monitors that are placed downstream of the second variable optical attenuators, respectively, to monitor the output optical powers of the output light rays output by the second variable optical attenuators, wherein
the attenuation controller controls the second variable optical attenuators so as to equalize the output optical powers the first intermediate optical power monitors monitor.

11. The optical transmission line switching apparatus according to claim 9, further comprising:
optical amplifiers that are placed between the input optical power monitors and the first variable optical attenuators on the optical transmission lines, respectively, to amplify the signal light rays input from the optical transmission lines; and
second intermediate optical power monitors that are placed downstream of the optical amplifiers, respectively, to monitor the output optical powers of the output light rays output by the optical amplifiers, wherein
the attenuation controller controls the optical amplifiers so as to equalize the output optical powers the second intermediate optical power monitors monitor.

12. The optical transmission line switching apparatus according to claim 1, wherein
the attenuation controller controls in a normal state the attenuation of the first variable optical attenuator placed downstream of the optical transmission line of the at least one backup system at not less than 25 db to block the signal light rays input from the optical transmission line of the at least one backup system.

13. An optical transmission system including an optical transmitter to output signal light rays; an optical branching device to split the signal light rays from the optical transmitter into an optical transmission line of a single active system and an optical transmission line of at least one backup system; an optical transmission line switching apparatus to carry out system switching between the plurality of optical transmission lines into which the optical branching device divides; and an optical amplifier to amplify the signal light rays from the optical transmission line from the active system and then outputs to an optical receiver, wherein the optical transmission line switching apparatus comprises:

input optical power monitors that are provided to the optical transmission lines, respectively, to monitor input optical powers of signal light rays input from the optical transmission lines;

first variable optical attenuators that are placed downstream of the input optical power monitors, respectively, to attenuate and output the signal light rays input from the optical transmission lines;

a multiplexer to multiplex the signal light rays output from the first variable optical attenuators;

a threshold setter to set a threshold for the input optical power monitor to detect the input optical power to the optical transmission line of the active system;

a threshold decider to decide whether the input optical power to the optical transmission line of the active system detected by the input optical power monitor is not greater than the threshold set by the threshold setter or not; and an attenuation controller to carry out, when the threshold decider decides that the input optical power is not greater than the threshold, system switching by controlling the first variable optical attenuators so as to gradually reduce attenuation of the signal light rays input from the optical transmission line of the at least one backup system, and to gradually increase attenuation of the signal light rays input from the optical transmission line of the active system.

* * * * *